United States Patent Office
3,465,038
Patented Sept. 2, 1969

3,465,038
PROCESS FOR THE PREPARATION OF 2-AMINO-
BENZOPHENONE-α-OXIMES
Lee Allen Dolan, Verona, N.J., assignor to Hoffmann-
La Roche Inc., Nutley, N.J., a corporation of New
Jersey
No Drawing. Filed Nov. 23, 1965, Ser. No. 509,408
Int. Cl. C07c 131/00
U.S. Cl. 260—566           8 Claims

ABSTRACT OF THE DISCLOSURE

β-Oximes of 2-aminobenzophenones are converted into their corresponding α-oximes by heating said β-oximes in a solvent medium selected from the group consisting of a halogenated aromatic hydrocarbon and xylene. The α-oximes of 2-aminobenzophenones are useful in the preparation of medicinally valuable 3-hydroxy-5-aryl-1,4-benzodiazepin-2-ones.

The present invention relates to new and improved processes. More particularly, the present invention relates to new and improved processes for converting a β-oxime of a 2-aminobenzophenone into an α-oxime of a 2-aminobenzophenone utilizing a specific solvent medium selected from the group consisting of a halogenated aromatic hydrocarbon and xylene. The said α-oximes are of increasing importance in view of their recently discovered capability of being transformed by a simple process which involves a minimal amount of steps into medicinally valuable 3-hydroxy-5-aryl-1,4-benzodiazepin-2-ones.

Oximes of 2-aminobenzophenones can be prepared, for example, by one procedure which involves first condensing a p-substituted aniline of the formula

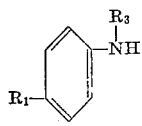

I wherein $R_1$ is selected from the group consisting of hydrogen, lower alkyl, halogen and nitro and $R_3$ is selected from the group consisting of hydrogen and lower alkyl with a benzoyl halide of the formula $$R_2-C_6H_4COX$$

II wherein X is a halogen atom selected from the group consisting of chlorine, bromine and iodine and $R_2$ is selected from the group consisting of hydrogen and halogen; conventionally, utilizing zinc chloride as a catalyst, to thereby prepare a 2-aminobenzophenone and, thereafter, reacting the so-formed ketone with hydroxylamine whereby to obtain the sought-after oxime.

Oximes of 2-aminobenzophenones can obviously also be prepared from 2-aminobenzophenones of the formula

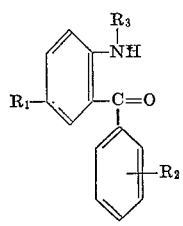

wherein $R_2$ and $R_3$ are as above and $R_1$ is selected from the group consisting of hydrogen and halogen; such ketones being obtained according to methods well known in the art, via the reaction thereof with hydroxylamine.

Two forms of oxime result from the above-described preparative techniques, namely, the syn- (α) form and the anti- (β) form. Such forms can be illustrated structurally as follows:

α-Form

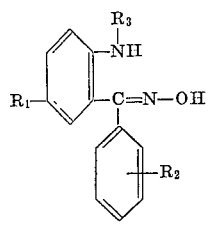

III

SYN with respect to the amino-substituted phenyl group.

β-Form

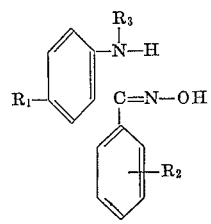

IV

ANTI with respect to the amino-substituted phenyl group, wherein $R_1$, $R_2$ and $R_3$ are as above.

The α-oxime of structure III above is the major product formed by the preparative techniques described broadly above. However, substantial amounts of the β-form are also formed when a 2-aminobenzophenone is reacted with hydroxylamine. Crystallization with petroleum-ether or benzene, for example, separates the α-oxime of Formula III. Time consuming, tedious separation procedures on the other hand, are required to separate the β-form of the oxime of Formula IV above from its situs of preparation. Since the recently discovered specific and unexpected conversion of the α-oxime of a 2-haloacetamido benzophenone into a 3-hydroxy-5-phenyl-1,4-benzodiazepine has brought with it increased interest in the α-oxime benzophenone from which the α-haloacetamido benzophenone oxime is prepared, the desirability of increasing the yield of an α-oxime of a 2-aminobenzophenone resulting from the reaction of a 2-aminobenzophenone with hydroxylamine should be readily apparent.

Thus, it is an object of the present invention to provide a procedure for the conversion of the β-oxime of a 2-aminobenzophenone into the corresponding α-oxime of a 2-aminobenzophenone.

In achieving this object within the purview of the present invention, it has been discovered that if a β-oxime of a 2-aminobenzophenone is heated in a solvent medium selected from the group consisting of xylene or a monohalogenated aromatic hydrocarbon such as chlorobenzene, conversion of the so-treated 2-aminobenzophenone β-oxime to the corresponding 2-aminobenzophenone α-oxime, results.

The above described conversion can be effected with or without isolating a 2-aminobenzophenone β-oxime of the Formula IV above from the reaction medium in which it is prepared. Thus, a 2-aminobenzophenone β-oxime can be isolated from the reaction medium in which it is prepared and, thereafter, converted to the α-oxime in the manner described herein. Alternatively, the conversion can be effected utilizing a crude containing a mixture of both the α-oxime of the Formula III above and the β-oxime of the Formula IV above.

In an advantageous process aspect of the present invention, the reaction is suitably effected at about the reflux temperature of the reaction mixture. Preferably, a halogenated aromatic hydrocarbon, suitably, a halogenated benzene, most advantageously, chlorobenzene, is utilized as the solvent medium in which the conversion is effected.

The term "lower alkyl" as utilized throughout the present disclosure is intended to designate a straight or branched chain saturated hydrocarbon group containing 1–7 carbon atoms in the chain such as methyl, ethyl and the like. The term "halogen" or the like as herein employed is intended to represent all four forms thereof, i.e., chlorine, fluorine, bromine and iodine, unless otherwise specified.

Thus, as is apparent from the above, by the present invention there is provided a unique and novel process for the facile conversion of a β-2-aminobenzophenone oxime into an α-2-aminobenzophenone oxime utilizing a conveniently available solvent medium. This simple process provides a ready means for increasing the yield of α-oximes of the Formula III above which are important, as is noted above, in preparing medicinally valuable 3-hydroxy-5-phenyl-1,4-benzodiazepin-2-ones.

The following examples are illustrative but not limitative of the present invention. All temperatures are stated in degrees centigrade.

Example 1

5 grams of 2-amino-5-chlorobenzophenone β-oxime and 25 cc. of chlorobenzene were refluxed for a period of six hours after which time, a bright yellow solution was obtained. The resulting bright yellow solution was chilled. A solid which formed was isolated as white crystals having a melting point of 170–72° and was found to be the α-oxime of 2-amino-5-chlorobenzophenone.

Example 2

To 3.5 moles of benzoyl chloride heated to 120°, there was carefully added with stirring 1.4 moles of p-chloroaniline. The resulting mixture was then heated to 180–200° and 230 grams of zinc chloride was added. The temperature was gradually increased to 225° and kept there until the hydrogen chloride evolution had ceased (1–2 hours). After cooling to 120°, water was cautiously added and the mixture stirred and heated to reflux. The hot water layer was decanted. The last-described step was repeated two additional times. The water-insoluble brown mass remaining after such decantations was dissolved in a boiling mixture of 350 ml. of water, 500 ml. of acetic acid and 650 ml. of concentrated sulfuric acid. The resultant solution was refluxed for 17 hours and then, after cooling, poured into a large amount of ice water. The so-cooled mixture was extracted with ether. The ether solution was washed with an excess of alkali, dried and concentrated to a small volume. Upon recrystallization from petroleum-ether, 2-amino-5-chlorobenzophenone was obtained.

A mixture of 200 gms. of 2-amino-5-chlorobenzophenone, 100 gms. of hydroxylamine hydrochloride, 1 l. of alcohol was stirred and refluxed for 22 hours. The mixture which contained 2-amino-5-chlorobenzophenone α-oxime and 2-amino-5-chlorobenzophenone β-oxime was concentrated in vacuo to a small volume.

10 grams of the so-prepared mixture and 100 cc. of chlorobenzene were refluxed overnight. Upon cooling the α-oxime of 2-amino-5-chlorobenzophenone was obtained.

Example 3

3 gms. of β-2-amino-5-chlorobenzophenone oxime were added to 30 cc. of xylene. The resulting reaction medium was refluxed for 20 hours. Chilling of a bright yellow solution which was obtained caused a white crystalline solid to form which was found to be the α-oxime of 2-amino-5-chlorobenzophenone.

I claim:
1. A process for preparing a 2-aminobenzophenone α-oxime of the structural configuration

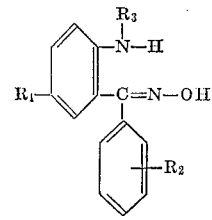

I wherein $R_1$ is selected from the group consisting of hydrogen, lower alkyl, halogen, nitro and trifluoromethyl; $R_2$ is selected from the group consisting of hydrogen and lower alkyl; from a β-oxime of a 2-aminobenzophenone of the structural configuration

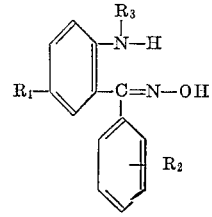

I wherein $R_1$, $R_2$ and $R_3$ are as above which comprises heating the last mentioned β-oxime of the Formula II above in the presence of a solvent medium selected from the group consisting of a mono halogenated benzene and xylene at about the reflux temperature of said solvent medium.

2. A process as defined in claim 1 wherein the solvent medium utilized is chlorobenzene.

3. A process as defined in claim 1 wherein $R_1$ is halogen and $R_2$ and $R_3$ are both hydrogen.

4. A process as defined in claim 3, wherein the solvent medium utilized is chlorobenzene.

5. A process as defined in claim 4 wherein $R_1$ is chlorine.

6. A process as defined in claim 1 wherein a crude mixture containing both the β-oxime of the Formula II above and the α-oxime of the Formula I above is the means by which the β-oxime is provided to the reaction zone.

7. A process as defined in claim 6 wherein the solvent medium utilized is chlorobenzene.

8. A process as defined in claim 7 wherein $R_1$ is halogen and $R_2$ and $R_3$ are both hydrogen.

References Cited

Hackel et al.: "Chemical Abstracts," vol. 27, pp. 72–3 (1933).

ROBERT V. HINES, Primary Examiner

U.S. Cl. X.R.

260—570, 239.3, 562, 239, 520, 999

UNITED STATES PATENT OFFICE
CERTIFICATE OF CORRECTION

Patent No. 3,465,038      Dated September 2, 1969

Inventor(s) Lee Allen Dolan

It is certified that error appears in the above-identified patent and that said Letters Patent are hereby corrected as shown below:

Column 2, lines 16 - 28, formula IV,

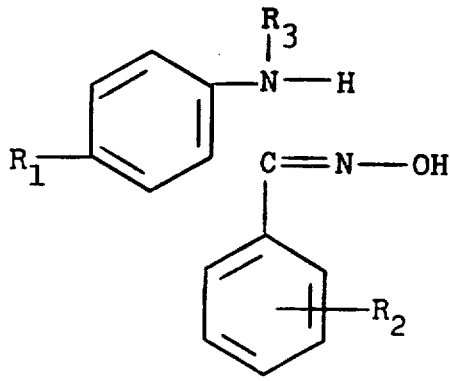

IV

SHOULD BE:

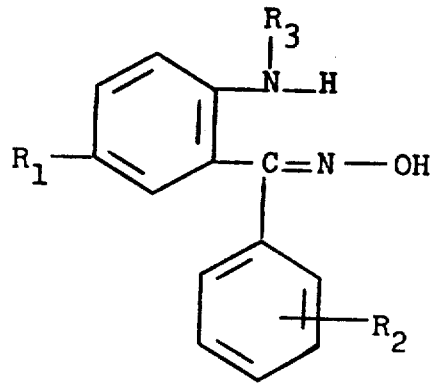

IV

Column 4, line 35, "I" should be: --II--

SIGNED AND SEALED

SEP 15 1970

(SEAL)
Attest:

Edward M. Fletcher, Jr.
Attesting Officer

WILLIAM E. SCHUYLER, JR.
Commissioner of Patents